United States Patent [19]

Eastes et al.

[11] Patent Number: 5,789,329
[45] Date of Patent: Aug. 4, 1998

[54] BORON-FREE GLASS FIBERS

[75] Inventors: Walter L. Eastes; Douglas A. Hofmann; John W. Wingert, all of Granville, Ohio

[73] Assignee: Owens Corning Fiberglas Technology, Inc., Summit, Ill.

[21] Appl. No.: 793,562

[22] PCT Filed: Jun. 6, 1996

[86] PCT No.: PCT/US96/09270

§ 371 Date: Feb. 18, 1997

§ 102(e) Date: Feb. 18, 1997

[87] PCT Pub. No.: WO96/39362

PCT Pub. Date: Dec. 12, 1996

Related U.S. Application Data

[63] Continuation-in-part of Ser. No. 568,008, Dec. 6, 1995, abandoned, and a continuation-in-part of Ser. No. 469,836, Jun. 6, 1995, abandoned.

[51] Int. Cl.$^6$ ................................................ C03C 13/06
[52] U.S. Cl. ............................... 501/36; 501/38; 501/70
[58] Field of Search ................................ 501/35, 38, 70, 501/36

[56] References Cited

U.S. PATENT DOCUMENTS

| | | |
|---|---|---|
| 3,847,626 | 11/1974 | Erickson et al. . |
| 3,847,627 | 11/1974 | Erickson et al. . |
| 3,876,481 | 4/1975 | Erickson et al. . |
| 3,887,386 | 6/1975 | Majundar . |
| 4,026,715 | 5/1977 | Erickson et al. . |
| 4,161,396 | 7/1979 | Greene et al. . |
| 4,542,106 | 9/1985 | Sproull . |
| 4,846,865 | 7/1989 | Hinze . |
| 5,055,119 | 10/1991 | Flautt et al. . |
| 5,332,698 | 7/1994 | Olds et al. ............... 501/36 |
| 5,332,699 | 7/1994 | Nyssen et al. ............ 501/35 |

FOREIGN PATENT DOCUMENTS

| | | |
|---|---|---|
| 520247 | 4/1940 | United Kingdom . |

*Primary Examiner*—Karl Group
*Attorney, Agent, or Firm*—C. Michael Gegenheimer; Inger H. Eckert

[57] ABSTRACT

Boron-free glass fibers suitable for textile and reinforcements are described. The glass fibers have compositions consisting essentially of $SiO_2$, CaO, $Al_2O_3$, and MgO. In a preferred embodiment, the glass contains essentially no fluorine, sulfate, or titania These glass fiber compositions advantageously have broad or large values for delta T (i.e., the difference between the log 3 or forming temperature—the temperature at which the glass has a viscosity of approximately 1000 poise—and the liquidus temperature), e.g., a delta T of at least about 125° F. (52° C.), more preferably of at least about 150° F. (66° C.).

15 Claims, No Drawings

5,789,329

1

BORON-FREE GLASS FIBERS

CROSS-REFERENCE TO RELATED APPLICATIONS

This is a continuation-in-part of U.S. patent application Ser. No. 08/568,008, filed 06 Dec. 1995 now abandoned, which is a continuation-in-part of U.S. patent application Ser. No. 08/469,836, filed 06 Jun 1995 now abandoned.

TECHNICAL FIELD AND INDUSTRIAL APPLICABILITY OF INVENTION

This invention relates to continuous glass fibers having glass compositions that are boron-free—i.e., essentially free of boron. The glass fibers are useful as reinforcement and textile glass fibers.

BACKGROUND OF INVENTION

The standard glass composition for making continuous glass fiber strands is "E" glass, which dates back to the 1940's. Despite the passing of fifty years, E glass, which is generally described in U.S. Pat. No. 2,334,961, still is the most common glass for making textile and reinforcement glass fibers. The key advantage of E glass is that its liquidus temperature is 200° F. (93° C.) below its forming temperature, the temperature at which the viscosity of the glass is customarily near 1000 poise.

E glass melts and refines at relatively low temperatures. E glass has a workable viscosity over a wide range of relatively low temperatures, a low liquidus temperature range, and a low devitrification rate. Generally, these glass compositions allow operating temperatures for producing glass fibers around 1900° F. to 2400° F. (1038° C. to 1316° C.) where the liquidus temperature is approximately 2100° F. (1149° C.) or lower. Industry typically maintains a fiber-forming temperature around 100° F. (38° C.) greater than the liquidus temperature for continuous fiber production in order to avoid devitrification in the glass delivery system and bushing.

In the mid 1970's, boron- and fluorine-containing glasses were developed which met these operating conditions. See U.S. Pat. No. 4,026,715. However, boron and fluorine in glass melts are volatile components that contribute significantly to the total emissions evolved from a glass melting operation.

Glass compositions free of boron or fluorine are known, e.g., as disclosed in British Patent Specification No. 520,427. However, known boron- and fluorine-free glass compositions have posed problems.

Such textile glasses as disclosed in British Patent Specification No. 520,427 melt and form at higher temperatures requiring operating conditions which could not be practically met. Devitrification (crystallization) in the bushing or during forming often occurred. For example, British Patent Specification No. 520,247 discloses glass compositions that are substantially alkaline-free containing CaO, MgO, $Al_2O_3$, and $SiO_2$, that may be modified by the addition of $B_2O_3$, $CaF_2$, $P_2O_5$, or a small amount of an alkali such as $Na_2O$, $K_2O$, or lithia. However, only a few of these fiberize, and only the boron-containing glasses fiberize in a continuous fiber process without difficulty. Glass No. 1 on page 2 of the British reference is one of the boron-free glasses which could be fiberized in a continuous fiber process by virtue of its 100° F. (38° C.) difference between its liquidus and forming temperatures, but its forming temperature, at 2350° F. (1288° C.), is too high to be formed according to earlier

2 known processes. The viscosity of Glass No. 2 in the British reference is 1000 poise at a temperature only 87° F. (31° C.) above the liquidus temperature. This probably would result in devitrification during forming in continuous glass fiber production. British Patent No. 520,247 teaches that this glass is preferably for insulating wool glasses, which can be formed with smaller differences between the liquidus and forming temperatures than can continuous fibers. Glass No. 3 is also preferably for insulating wool glasses. The liquidus temperature of Glass No. 3 of the British reference is 52° F. (11° C.) above the forming temperature and would crystallize in the bushing in a continuous fiber operation.

U.S. Pat. No. 4,542,106 to Sproull discloses boron- and fluorine-free glass fiber compositions. In general, they contain 58 to 60 percent $SiO_2$, 11 to 13 percent $Al_2O_3$, 21 to 23 percent CaO, 2 to 4 percent MgO, and 1 to 5 percent $TiO_2$. The glass fiber compositions may also contain alkali metal oxide and trace quantities of $Fe_2O_3$. The glasses, in addition to being free of boron and fluorine and having significant $TiO_2$ present, have electrical leakage characteristics such that they can be used in lieu of standard E and "621" glasses (621 glasses are generally described in U.S. Pat. No. 2,571, 074). U.S. Pat. No. 3,847,627 to Erickson et al. also discloses fiberizable glass compositions that are free of boron and fluorine and contain a significant amount of $TiO_2$. The Erickson et al. compositions consist essentially of, by weight, 54.5 to 60 percent $SiO_2$, 9 to 14.5 percent $Al_2O_3$, 17 to 24 percent CaO, 2 to 4 percent $TiO_2$, 1.5 to 4 percent MgO, and 1 to 5.5 percent of ZnO, SrO, or BaO. The use of significant amounts of titania ($TiO_2$), however, has drawbacks. For instance, a significant amount of $TiO_2$ can impart an undesirable color to the glass.

To reduce the cost of manufacturing glass fibers, and to reduce environmental pollution without increasing production costs, there is still a need in the art for improved glass compositions that are essentially free of boron and fluorine but avoid undue discoloration and still retain advantageous properties akin to E glass, and may readily be fiberized in a continuous fiber operation.

SUMMARY OF INVENTION

Thus, an object of the invention is to achieve economically and environmentally desirable glass fibers with advantageous properties. Another object is to prepare glass fibers of compositions with low or no boron and fluorine levels that may be fiberized without great difficulty. These and other objects and advantages have been achieved by the glass fibers of the invention.

We have discovered that the sulfate level must be reduced in the batch in order to effectively melt and form glasses having compositions generally similar to those disclosed in British Patent No. 520,247. The glass compositions of the current invention, however, surprisingly result in larger differences between the forming and liquidus temperatures (i.e., wider delta T values). We have improved the glass composition, moreover, using a process enabling us to successfully fiberize a glass with exceptional properties.

The glass fibers of the invention, which are suitable for textile and reinforcement glass fibers, generally have a glass composition consisting essentially of:

| Component | Amount (weight percent) |
|---|---|
| SiO$_2$ | 59.0 to 62.0 |
| CaO | 20.0 to 24.0 |
| Al$_2$O$_3$ | 12.0 to 15.0 |
| MgO | 1.0 to 4.0 |
| F$_2$ | 0.0 to 0.5 |
| Na$_2$O | 0.1 to 2.0 |
| TiO$_2$ | 0.0 to 0.9 |
| Fe$_2$O$_3$ | 0.0 to 0.5 |
| K$_2$O | 0.0 to 2.0 |
| SO$_3$ | 0.0 to 0.5 |

The total of all the components, including any trace impurities, in the composition is, of course, 100 percent by weight. The glass has a viscosity of 1000 poise at temperatures ranging from 2100° F. to 2500° F. (1149° C. to 1371° C.), and the liquidus temperature of the glass is at least 100° F. (38° C.) below the temperature at which the fibers are formed. Despite their high-temperature operating conditions, these glasses can be fiberized without devitrification in the bushing or at forming.

In a preferred embodiment, the weight percent of MgO ranges from 2.0 to 3.5.

In another preferred embodiment, the amounts of SiO$_2$, CaO, Al$_2$O$_3$, MgO, and R$_2$O(R$_2$O=Na$_2$O+K$_2$O) in these compositions are:

| Component | Weight Percent |
|---|---|
| SiO$_2$ | 59.0–61.0 |
| CaO | 21.5–22.5 |
| Al$_2$O$_3$ | 12.7–14.0 |
| MgO | 2.5–3.3 |
| Na$_2$O + K$_2$O | 0.1–2.0 |
| TiO$_2$ | 0.0–0.6 |

The viscosity of these compositions are 1000 poise at temperatures ranging from 2200° F. to 2400° F. (1204° C. to 1316° C.) and the liquidus temperatures of these compositions are at least 125° F. (52° C.) below the temperature for a viscosity of 1000 poise.

More preferably, the amounts of SiO$_2$, CaO, Al$_2$O$_3$, MgO, and R$_2$O are as follows:

| Component | Weight Percent |
|---|---|
| SiO$_2$ | 59.5–60.5 |
| CaO | 21.7–22.3 |
| Al$_2$O$_3$ | 13.0–13.5 |
| MgO | 2.7–3.3 |
| Na$_2$O + K$_2$O | 0.5–1.0 |

In an especially preferred embodiment, the TiO$_2$ content is not more than 0.6 weight percent, more preferably not more than 0.04 weight percent. In an additional preferred embodiment, the TiO$_2$ content is not more than 0.6 weight percent and the F$_2$ content is essentially zero. In another preferred embodiment, the sulfate, fluorine, and titania contents are each essentially zero.

In an especially preferred embodiment, continuous fiber is made having approximately the following glass composition: 60.1% SiO$_2$; 22.1% CaO; 13.2% Al$_2$O$_3$; 3.0% MgO; 0.2% K$_2$O; 0.2% Fe$_2$O$_3$; 0.1% F$_2$; 0.5% TiO$_2$; and 0.6% Na$_2$O. The glass has temperature characteristics on the order of log 3 of about 2300° F. (1260° C.), liquidus of about 2200° F. (1200° C.), and delta T of about 150° F. (66° C.). Such a glass also has approximately the following properties: density (offiber; according to ASTM D1505) of about 2.62 g/ml; tensile strength at 23° C. (of pristine, unsized laboratory-produced single fiber; ASTM D2101) of about 3100–3800 MPa (450–550 kpsi); elastic modulus (sonic method) of about 80–81 GPa (Mpsi); elongation at breaking (of pristine, unsized laboratory-produced single fiber; ASTM D2101) of about 4.6%; refractive index (of pristine, unsized laboratory-produced single fiber; oil immersion) of about 1.560–1.562; thermal linear expansion at 0°–300° C. (of bulk annealed glass; ASTM D696) of about 6.0 ppm/° C.; softening point (ASTM C338) of about 916° C.; annealing point (ASTM C336) of about 736° C.; strain point (ASTM C336) of about 691° C; dielectric constant at 23° C. and 1 MHz (of bulk annealed glass; ASTM D150) of about 7.0; dissipation factor at 23° C. and 1 MHz (of bulk annealed glass; ASTM D150) of about 0.001; volume resistivity (of bulk annealed glass; ASTM D257; extrapolated from measurements at elevated temperatures, 120°–500° C., based on log resistivity=A/temperature+B) of about 8.1*10**26; dielectric strength at 4.8 mm thickness (of bulk annealed glass; ASTM D149) of about 8 kV/mm; percentage of original tenacity after exposure to 5% NaOH at 23° C. for 28 days (of pristine, unsized laboratory-produced single fiber) of about 30.

PREFERRED EMBODIMENTS OF INVENTION

The glass fiber compositions of the invention are essentially free of boron. By "essentially free" we mean that the composition contains at most only a trace quantity of the specified component, e.g., from impurities in the raw materials. In a preferred embodiment, the glass fibers are also essentially fluorine-free. In another preferred embodiment, the glass fibers are also essentially titania-free.

In general, fibers according to the invention may be prepared as follows. The components, which may be obtained from suitable ingredients or raw materials (e.g., sand for SiO$_2$, burnt lime for CaO, dolomite for MgO) and may optionally contain trace quantities of other components, are mixed or blended in a conventional manner in the appropriate quantities to give the desired weight percentages of the final composition. The mixed batch is then melted in a furnace or melter, and the resulting molten glass is passed along a forehearth and into fiber-forming bushings located along the bottom of the forehearth. The molten glass is pulled or drawn through holes or orifices in the bottom or tip plate of the bushing to form glass fibers. The streams of molten glass flowing through the bushing orifices are attenuated to filaments by winding a strand of the filaments on a forming tube mounted on a rotatable collet of a winding machine. The fibers may be further processed in a conventional manner suitable for the intended application.

The temperatures of the glass at the furnace, forehearth, and bushing are selected to appropriately adjust the viscosity of the glass. The operating temperatures may be maintained using suitable means, such as control devices. Preferably, the temperature at the front end of the melter is automatically controlled to help avoid devitrification.

The use of sulfate in the furnace operation helps avoid seeding or bubbling problems in the glass. When producing large-scale melts, we have found it important to add carbon to the batch to control foam levels in the furnace. Preferably the sulfate-to-carbon ratio (SO$_3$/C) in the batch is from about 0.6 to about 1.7, in contrast with E glass, which typically runs best at an SO$_3$/C=3.0 to 10.0. The sulfate-to-carbon ratio is preferably controlled in the furnace to keep the foam at a manageable level and thereby allow heat to penetrate into the glass from the gas burners. It should be understood, however, that the compositions are preferably essentially free of sulfate, since this, like carbon, is almost completely or practically entirely eliminated from the glass during melting.

Furthermore, the addition of a small amount of alkali helps improve the melting rate of the batch. For example, about 0.70 weight percent $Na_2O$ may be added to facilitate melting.

The forehearth design should be such that throughout the forehearth the glass is kept above the liquidus temperature. The forehearth should be constructed to provide for even heating of the glass to avoid cold spots causing devitrification.

The improved glass compositions can be readily fiberized via recent improvements in bushing technology. See U.S. Pat. Nos. 5,055,119, 4,846,865 and 5,312,470, the disclosures of which are incorporated by reference herein. Through such improved bushing technology, the fibers may be formed at higher temperatures with smaller differences between the forming and liquidus temperatures. In general, the bushing should be structured to provide long life and resist sagging, which is dependent on the pressure of the glass on the tip plate and the temperature. For example, the bushing can be made of a stiff alloy composition, such as one containing about 22–25% rhodium and platinum. The stiffness of the tip plate may be enhanced through the use of structural or mechanical reinforcements, such as T-gussets. The bushing screen should have high corrosion resistance, which may be accomplished, e.g., by constructing the plate screen from platinum.

The discussion above regarding parameters and equipment is provided to illustrate a process for making the inventive glass fibers. It should be understood that the artisan may suitably modify or optimize the process parameters and equipment in light of the specific glass fibers being made and conventional design considerations.

The invention will now be illustrated through the following exemplary embodiments.

Example I

Four production samples of reinforcement glass fibers were produced with an average glass composition analyzed as consisting essentially of, by weight: 60.01% $SiO_2$; 22.13% CaO; 12.99% $Al_2O_3$; 3.11 % MgO; 0.04% $F_2$; 0.63% $Na_2O$; 0.55% $TiO_2$; 0.25% $Fe_2O_3$; 0.14% $K_2O$; and 0.02% $SO_3$. On average, the forming temperature for a viscosity of 1000 poise ("log 3") was 2298° F. (1259° C.), the liquidus temperature was 2146° F. (1174° C.), and the forming-liquidus temperature difference ("delta T") was 135° F. (57° C.).

Example II

Using a laboratory melter, glass fibers were produced from reagents providing the following batch composition, with percentages being by weight: 60.08% $SiO_2$; 22.07% CaO; 13.21% $Al_2O_3$; 3.01% MgO; 0.16% $K_2O$; 0.23% $Fe_2O_3$; 0.05% $SO_3$; 0.06% $F_2$; 0.52% $TiO_2$; and 0.60% $Na_2O$. The resulting glass had the following temperature properties: log 3=2309° F. (1265° C.); liquidus=2156° F. (1180° C.); and delta T=153° F. (67° C.).

The glass fibers were prepared as follows. Approximately 30 grams of glass cullet produced by melting reagent-grade chemicals corresponding to the above-identified composition in a platinum crucible were charged into a 1-inch (2.54-cm) diameter, resistively heated bushing. The glass was heated for an hour at a temperature of 100° C. above the forming temperature. The temperature of the bushing was then reduced to the forming temperature, and fibers were produced by pulling the glass through a single orifice in the bushing onto a winder. It should be noted that although a minute quantity of sulfate ($SO_3$) was added to help prevent seeding/bubbling problems in the glass, essentially all of the sulfate would have been driven off with the bubbles during heating of the glass batch.

Examples III–VIII

In a manner analogous to that described in Example II, glass fibers were prepared from the batch compositions (with percentages being by weight) shown in the table below.

| Example No.: | III | IV | V | VI | VII | VIII |
|---|---|---|---|---|---|---|
| % $SiO_2$: | 59.45 | 61.05 | 59.05 | 59.05 | 59.45 | 59.96 |
| % CaO: | 22.69 | 22.29 | 24.29 | 22.29 | 22.69 | 22.18 |
| % $Al_2O_3$: | 13.48 | 13.08 | 13.08 | 15.08 | 13.48 | 13.19 |
| % MgO: | 3.23 | 2.83 | 2.83 | 2.83 | 3.23 | 3.07 |
| % $K_2O$: | 0.63 | 0.23 | 0.23 | 0.23 | 0.23 | 0.25 |
| % $Fe_2O_3$: | 0.36 | 0.36 | 0.36 | 0.36 | 0.36 | 0.28 |
| % $SO_3$: | 0.05 | 0.05 | 0.05 | 0.05 | 0.05 | 0.05 |
| % $F_2$: | 0.04 | 0.04 | 0.04 | 0.04 | 0.04 | 0.09 |
| % $TiO_2$: | 0.04 | 0.04 | 0.04 | 0.04 | 0.04 | 0.37 |
| % $Na_2O$: | 0.03 | 0.03 | 0.03 | 0.03 | 0.43 | 0.55 |
| Log 3: | 2308° F. (1264° C.) | 2334° F. (1279° C.) | 2279° F. (1248° C.) | 2353° F. (1289° C.) | 2298° F. (1259° C.) | 2310° F. (1266° C.) |
| Liquidus: | 2180° F. (1193° C.) | 2161° F. (1183° C.) | 2136° F. (1169° C.) | 2227° F. (1219° C.) | 2171° F. (1188° C.) | 2181° F. (1194° C.) |
| Delta T: | 128° F. (53° C.) | 173° F. (78° C.) | 143° F. (62° C.) | 127° F. (53° C.) | 127° F. (53° C.) | 129° F. (54° C.) |

Example IX

Glass fibers were prepared having the following composition with essentially zero fluorine, sulfate, and titania levels: 61.00% $SiO_2$; 22.24% CaO; 12.00% $Al_2O_3$; 3.25% MgO; 0.52% $K_2O$; 0.30% $Fe_2O_3$; 0.00% $SO_3$; 0.00% $F_2$; 0.00% $TiO_2$; and 0.69% $Na_2O$. The glass had the following temperature characteristics: log 3=2304° F. (1262° C.); liquidus=2203° F. (1206° C.); and delta T=101° F. (38° C.).

As is understood in the art, the above exemplary compositions do not always total precisely 100% of the listed components due to statistical conventions (e.g., rounding and averaging). Of course, the actual amounts of all components, including any impurities, in a specific composition always total to 100%.

Furthermore, it should be understood that where small quantities of components are specified in the compositions, e.g., quantities on the order of about 0.05 weight percent or less, those components may be present in the form of trace impurities present in the raw materials, rather than intentionally added. Moreover, components may be added to the batch composition, e.g., to facilitate processing, that are later eliminated, resulting in a glass composition that is essentially free of such components. Thus, for instance, although minute quantities of components such as fluorine and sulfate have been listed in various examples, the resulting glass composition may be essentially free of such components—e.g., they may be merely trace impurities in the raw materials for the silica, calcium oxide, alumina, and magnesia components in commercial practice of the invention or they may be processing aids that are essentially removed during manufacture. As apparent from the above examples, glass fiber compositions of the invention have advantageous properties, such as low viscosities and wide (high) delta T values. Other advantages and obvious modifications of the invention will be apparent to the artisan from the above description and further through practice of the invention.

We claim:

1. Continuous glass fiber having a composition essentially free of boron and consisting essentially of 59.0 to 62.0 weight percent $SiO_2$, 20.0 to 24.0 weight percent CaO, 12.0 to 15.0 weight percent $Al_2O_3$, 1.0 to 4.0 weight percent MgO, 0.0 to 0.5 weight percent $F_2$, 0.1 to 2.0 weight percent $Na_2O$, 0.0 to 0.9 weight percent $TiO_2$, 0.0 to 0.5 weight percent $Fe_2O_3$, 0.0 to 2.0 weight percent $K_2O$, and 0.0 to 0.5 weight percent $SO_3$, wherein the composition has (i) a viscosity of 1000 poise at a forming temperature of from 2100° F. (1149° C.) to 2500° F. (1371° C.) and (ii) a liquidus temperature at least 100° F. (38° C.) below the forming temperature.

2. Continuous glass fiber according to claim 1, wherein the MgO content is 2.0 to 3.5 weight percent.

3. Continuous glass fiber according to claim 1, wherein the $SiO_2$ content is 59.0 to 61.0 weight percent, the CaO content is 21.5 to 22.5 weight percent, the $Al_2O_3$ content is 12.7 to 14.0 weight percent, the MgO content is 2.5 to 3.3 weight percent, the total content of $Na_2+K_2O$ is 0.1 to 2.0 weight percent, the $TiO_2$ content is 0.0 to 0.6 weight percent, the forming temperature is from 2200° F. (1204° C.) to 2400° F. (1316° C.), and the difference between the forming temperature and the liquidus temperature is at least 125° F. (52° C.).

4. Continuous glass fiber according to claim 3, wherein the $SiO_2$ content is 59.5 to 60.5 weight percent, the CaO content is 21.7 to 22.3 weight percent, the $Al_2O_3$ content is 13.0 to 13.5 weight percent, the MgO content is 2.7 to 3.3 weight percent, and the total content of $Na_2+K_2O$ is 0.5 to 1.0 weight percent.

5. Continuous glass fiber according to claim 3, wherein the $SiO_2$ content is 60.1 weight percent, the CaO content is 22.1 weight percent, the $Al_2O_3$ content is 13.2 weight percent, the MgO content is 3.0 weight percent, and the total content of $Na_2+K_2O$ is 0.8 weight percent.

6. Continuous glass fiber according to claim 1, wherein the $TiO_2$ content is not more than 0.6 weight percent.

7. Continuous glass fiber according to claim 6, wherein the $TiO_2$ content is 0.00 to 0.04 weight percent.

8. Continuous glass fiber according to claim 7, wherein the $F_2$ content is 0.00 to 0.04 weight percent.

9. Continuous glass fiber according to claim 1, wherein the composition is essentially free of $TiO_2$.

10. Continuous glass fiber according to claim 1, wherein the composition is essentially free of $F_2$.

11. Continuous glass fiber according to claim 1, wherein the composition is essentially free of $SO_3$.

12. Continuous glass fiber according to claim 1, wherein the $SO_3$, $F_2$, and $TiO_2$ contents are each no more than 0.05 weight percent.

13. Continuous glass fiber according to claim 1, wherein the difference between the forming temperature and the liquidus temperature is at least 150° F. (66° C.).

14. Continuous glass fiber according to claim 1, wherein the $SiO_2$ content is 60.2 weight percent, the CaO content is 22.0 weight percent, the $Al_2O_3$ content is 13.2 weight percent, the MgO content is 3.0 weight percent, the total content of $Na_2+K_2O$ is 0.8 weight percent, the forming temperature is from 2200° F. (1204° C.) to 2400° F. (1316° C.), and the difference between the forming temperature and the liquidus temperature is at least 125° F. (52° C.).

15. Continuous glass fiber according to claim 1, wherein the $SiO_2$ content is about 60.1 weight percent, the CaO content is about 22.1 weight percent, the 3 content is about 13.2 weight percent, the MgO content is about 3.0 weight percent, the $K_2O$ content is about 0.2 weight percent, the $Na_2O$ content is about 0.6 weight percent, the $Fe_2O_3$ content is about 0.2 weight percent, the total content of $SO_3$ and $F_2$ content is about 0.1 weight percent, the $TiO_2$ content is about 0.5 weight percent, the forming temperature is from about 2300° F. (1204° C.) to about 2400° F. (1316° C.), and the difference between the forming temperature and the liquidus temperature is at least about 150° F. (52° C.).

* * * * *

UNITED STATES PATENT AND TRADEMARK OFFICE
CERTIFICATE OF CORRECTION

PATENT NO.   : 5,789,329
DATED        : August 4, 1998
INVENTOR(S)  : Eastes et al.

It is certified that error appears in the above-identified patent and that said Letters Patent is hereby corrected as shown below:

Column 8,
Line 40, should read:
-- content is about 22.1 weight percent, the $Al_2O_3$ content is about --

Signed and Sealed this

Twelfth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 5,789,329
DATED         : August 4, 1998
INVENTOR(S)   : Walter L. Easter, Douglas A. Hofmann and John W. Wingert It is certified that error appears in the above-identified patent and that said Letters Patent is hereby corrected as shown below:

Title page,
Item [57], ABSTRACT,
Line 10, should read -- delta T of at least about 125 F. (69 C.), more preferably of --
Line 11, should read -- at least about 150 F. (83 C.). --

Column 1,
Line 25, should read -- temperature is 200 F. (111 C.) below its forming --
Line 36, should read -- forming temperature around 100 F. (55 C.) greater than the --
Line 65, should read -- its 100 F.(55 C.) difference between its liquidus and --

Column 2,
Line 2, should read -- reference is 1000 poise at a temperature only 87 F. (48 C,). --
Line 11, should read -- (28 C.) above the forming temperature and would crystal- --

Column 3,
Line 19, should read -- F. (55 C.) below the temperature at which the fibers are --
Line 40, should read -- tions are at least 125 F. (70 C.) below the temperature for --
Line 66, should read -- 2200 F. (1204 C.). and delta T of about 150 F. (83 C.). --

Column 4,
Line 5, should read -- method) of about 80-81 GPa (11.6-11.7 Mpsi); elongation at breaking --

Column 6,
Line 2, should read -- 135 F. (75 C). --
Line 13, should read -- (1180 C.); and delta T=153 F. (85 C.). --
Line 53, should read
-- (71 C.)     (96 C.)     (79 C.)     (71 C.)     (71 C.)     (72 C.) --
Line 63, should read -- liquidus=2203 F. (1206 C.); and delta T=101 F. (56 C.). --

Column 7,
Line 36, should read -- temperature at least 100 F. (56 C.) below the forming --
Line 44, should read -- weight percent, the total content of $Na_2O+K_2O$ is 0.1 to 2.0 --
Line 49, should read -- (69 C.). --

UNITED STATES PATENT AND TRADEMARK OFFICE
CERTIFICATE OF CORRECTION

PATENT NO. : 5,789,329
DATED : August 4, 1998
INVENTOR(S) : Walter L. Easter, Douglas A. Hofmann and John W. Wingert It is certified that error appears in the above-identified patent and that said Letters Patent is hereby corrected as shown below:

Column 8,
Line 3, should read -- weight percent, and the total content of $Na_2O+K_2O$ is 0.5 to --
Line 9, should read -- content of $Na_2O+K_2O$ is 0.8 weight percent. --
Line 28, should read -- liquidus temperature is at least 150 F. (83 C.). --
Line 33, should read -- content of $Na_2O+K_2O$ is 0.8 weight percent, the forming --
Line 37, should read -- the liquidus temperature is at least 125 F. (69 C.). --
Line 47, should read -- 2200 F. (1204 C.) to about 2400 F.(1316 C.). and the --
Line 49, should read -- temperature is at least about 150 F.(83 C.). --

Signed and Sealed this

Ninth Day of September, 2003

JAMES E. ROGAN
*Director of the United States Patent and Trademark Office*